April 6, 1954   J. S. BENSON   2,674,149
MULTIPLE PRONGED FASTENER DEVICE WITH SPREADING MEANS
Filed March 1, 1952

INVENTOR.
JERRY S. BENSON
BY
ATTORNEY

Patented Apr. 6, 1954

2,674,149

UNITED STATES PATENT OFFICE 2,674,149

MULTIPLE PRONGED FASTENER DEVICE WITH SPREADING MEANS

Jerry S. Benson, Jefferson, Ohio

Application March 1, 1952, Serial No. 274,418

3 Claims. (Cl. 85—13)

The invention, indicating its general object, relates to a nail-type fastener that is positively self-locking in the material into which it is driven, which fastener can be made economically from sheet metal.

Further objects include the provision of an improved nail-type fastener for securing, for example, roofing sheets and the like to nailing ground material of low density such as Celotex (trade-mark) and gypsum board; a nail-type fastener which can be made inexpensively in one piece from sheet metal stock, substantially without waste, and shank portions of which (when the fastener is driven, as through an object to be secured, into the supporting material for such object), will be positively expanded into anchoring engagement with the supporting material by driving-force-action, laterally of the axis of driving force application, and be positively locked in expanded position.

More specifically, an object is to provide a nail type fastener made of sheet metal to provide a head and two shanks in the principal plane of the metal from which they are formed (i. e. a staple) and wherein the head carries a tongue on its under side initially spaced from or underhanging the head and which spreads the shanks apart in said plane (edgewise of the metal) and holds them so spread apart, as a function of driving the fastener into the supporting material; and, as a further feature, wherein the tongue is spring-latched in nail-shank-spreading position so that any tendency for the tongue to spring back to its initial position, if not permanently deformed beyond the elastic limit of its material, is positively restrained.

Other objects will be brought out in the following description of the illustrative forms of fastener shown in the accompanying drawing wherein.

The essential problem which is well exhibited by the nailing of roofing paper or shingles to Celotex or gypsum board, used as a ground or supporting material, is that of preventing the nails from being withdrawn from the low density supporting material in the course of time. Clinching of ordinary nails is frequently impossible, and in any event is timetaking. Self clinching nails both of the staple type and single shank type are already known, but either they are unduly complicated hence expensive or they fail to serve their purpose—as when the clinching is not directly adjacent the supporting material.

Figure 1:
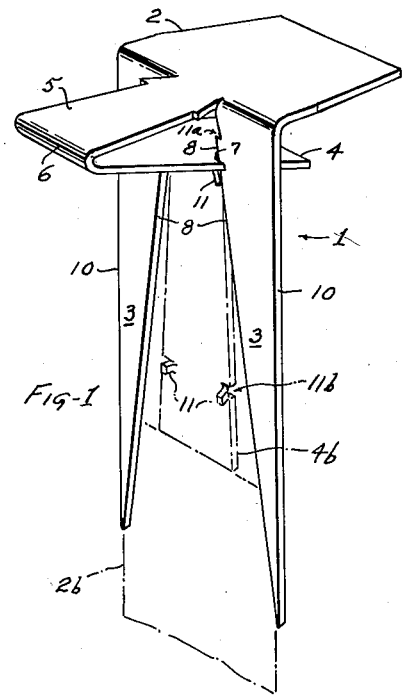
Figures 1 and 2 are perspective, greatly-enlarged-scale views of respective forms.
Figure 3:
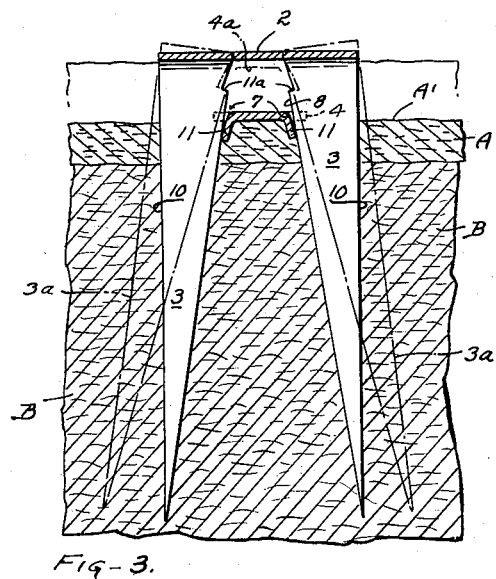
Figure 3 is a sectional, partly diagrammatic view according to Figure 1, taken in a plane parallel to that of the nail shanks.

The present proposal is a nail of the double shank or staple type fastener as already indicated; and, in the form shown by Figure 1, comprises a one-piece sheet metal member 1 having a generally rectangular head 2, a pair of suitably pointed shanks 3 bent or struck downwardly in a common plane normal to the principal plane of the head, and a shank-spreading and shank-locking tongue 4 supported by the head through the intermediary of a relatively narrow central extension 5 of the head beyond the common plane of the shanks 3. The tongue proper is defined by a supporting bend 6 in the metal and tongue-edge portions 7 which, as shown in Figure 3, lie close to or in contact with upwardly and symmetrically converging edge portions 8 of the shanks in vertically spaced relation to the head. In other words, the tongue 4 is suitably supported in underhanging spaced relation to the head, so that as the shanks of the nail are driven, for example by a hammer in contact with the head, through a layer of penetrable material A, Figure 3, and into a relatively low density body B of any kind, the edges 7 of the tongue (through contact with the top surface A' of material A) act as cams against the converging edge portions 8 of the shanks to spread the shanks in the principal plane of the metal of which the shanks are formed. The driving operation, as partly exhibited in Figure 3, wherein the shanks are shown in spread or nail-anchoring position by broken lines at 3a, results in the relatively opposite thin "edge" surfaces 10 of the shanks forcing their way into the low density material B as by tearing or compacting it (depending upon its composition and structure) and meanwhile the camming edge portions 8 of the tongue 4, as the tongue is relatively elevated to positions 4a, Figure 3, in respect to the head generally, lock the shanks in their spread or nail-anchoring positions.

The initial angle of convergence of the shank edge surfaces 8, as illustrated, is such that the coacting tongue edge surfaces 7 exert a very powerful horizontal or spreading force on the shanks, and movement of the shanks in the plane of their metal is enabled by flexing of the head as necessary but not through bending of the shanks themselves as happens in the case of most if not all of the already known types of staples which are designed to be, in effect, self spreading as driven into final position. Further, said angle of convergence of surfaces 8 is, in the final position of the shanks a locking angle in respect to the tongue 4, such that any spring force remaining in the region of attachment of the tongue to the head (bend 6) cannot dislodge the tongue from its locking position at 4a nor can forces applied to the shanks (as through attempted extraction of the fastener) effect breaking of the lock.

The Figure 1 form of fastener may be very economically made from uniform width strip stock with a minimum of scrap by shearing the tongue 4 (initial position at 4b) and part of the head, as at 2b, from material lying between the shanks 3 as cut from the strip.

Figures 1 and 3 show one form of positive locking means for holding the shanks 3 in anchoring position while positively retaining the head 2 and tongue 4 against becoming separated in the event the metal at the bend or fold 6 is not strained beyond its elastic limit when the fastener 1 is driven into place. That situation might obtain, for example, if the entire fastener were to be uniformly spring tempered. The positive locking means just above referred to comprises spring latching members 11 lanced from the sheet metal of the tongue 4 and shoulders 11a lanced from the metal between the shanks 3 and tongue portion 5. The latching members 11 of Figure 1 are quite narrow so that edged slots 11b are formed in the tongue 4, fairly closely embracing the adjacent margins of the respective shanks 3.

Figure 2:
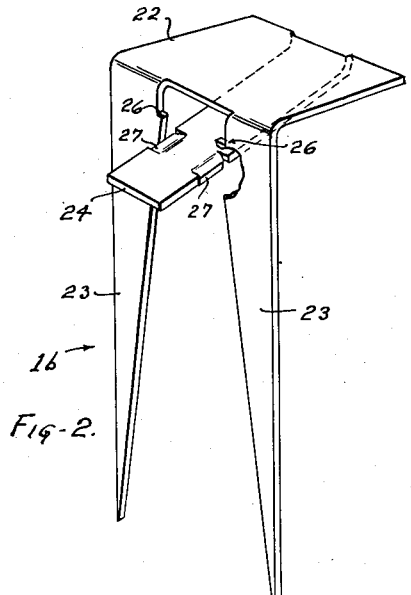
Figure 4:
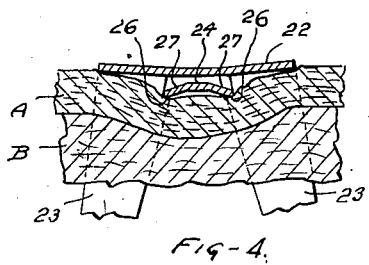
Figure 4 is a fragmentary view similar to Figure 3 showing the locking operation performed by use of the invention in accordance with Figure 2.

In Figures 2 and 4, fastener 1b, a positive locking of the tongue 24 (which, for clearness of illustration only, is shown as attached to the far edge of the head 22) is secured by provision of locking shoulders 26 on the shanks 23 near the plane of the head and which coact with downwardly diverted spring lip portions 27 of the tongue as illustrated in Figure 4 when the fastener has been driven into its final position causing the shanks to be spread apart as already described.

I claim:

1. A fastener of the nail type adapted to be made in one piece from sheet metal, the fastener comprising a head, two sheet metal shanks supported by and depending from the head in a common plane constituting the principal plane of the sheet metal from which the shanks are formed, and a tongue supported by the head and extending from a portion thereof lying remotely of said plane into underhanging spaced relation to the head and disposed between the shanks, the shanks having upwardly converging metal edge surfaces for camming engagement by the tongue so that, as the fastener is driven into a supporting material, the tongue forces the shanks apart into nail-anchoring relationship to said material, the tongue having notches on its opposite sides located to receive the converging edge portions of the shanks.

2. A fastener of the nail type adapted to be made in one piece from sheet metal, the fastener comprising a head, two sheet metal shanks supported by and depending from the head in a common plane constituting the principal plane of the sheet metal from which the shanks are formed, and a tongue supported by the head and extending from a portion thereof lying remotely of said plane into underhanging spaced relation to the head and disposed between the shanks, the shanks having upwardly converging metal edge surfaces for camming engagement by the tongue so that, as the fastener is driven into a supporting material, the tongue forces the shanks apart into nail-anchoring relationship to said material, the upwardly converging edge surfaces of the shanks terminating at latching shoulders underlying the head, close thereto, and engageable by the tongue positively to hold the tongue in proximity to the head.

3. The fastener according to claim 2, wherein the tongue, in its regions of engagement with the converging edge portions of the shanks, has downwardly diverging spring lips, and the converging edges of the shanks terminate upwardly in tongue-locking shoulders, closely adjacent the head, for holding the tongue close to the head.

References Cited in the file of this patent

UNITED STATES PATENTS

| Number | Name | Date |
|---|---|---|
| 1,282,333 | Walberg | Oct. 22, 1918 |
| 2,383,135 | Lang | Aug. 21, 1945 |
| 2,513,105 | Poupitch | June 27, 1950 |
| 2,550,030 | Gisondi | Apr. 24, 1951 |